Figure 1:
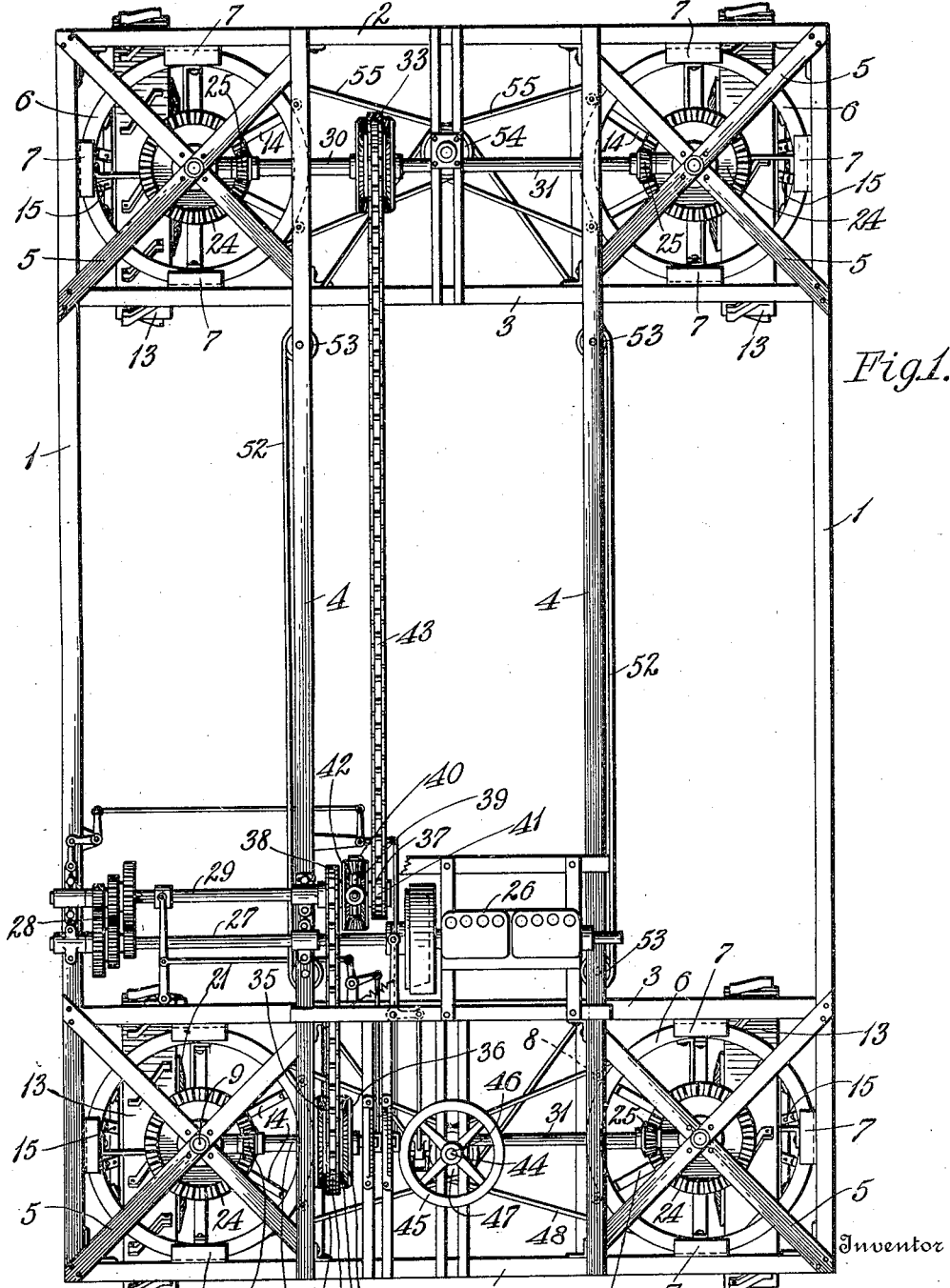

J. W. ROMINE.
TRACTOR.
APPLICATION FILED SEPT. 25, 1912.

1,064,774.

Patented June 17, 1913.

3 SHEETS—SHEET 1.

Witnesses
Chas. W. Stauffiger
Anna V. Dorr

Inventor
John W. Romine,
By
Attorneys

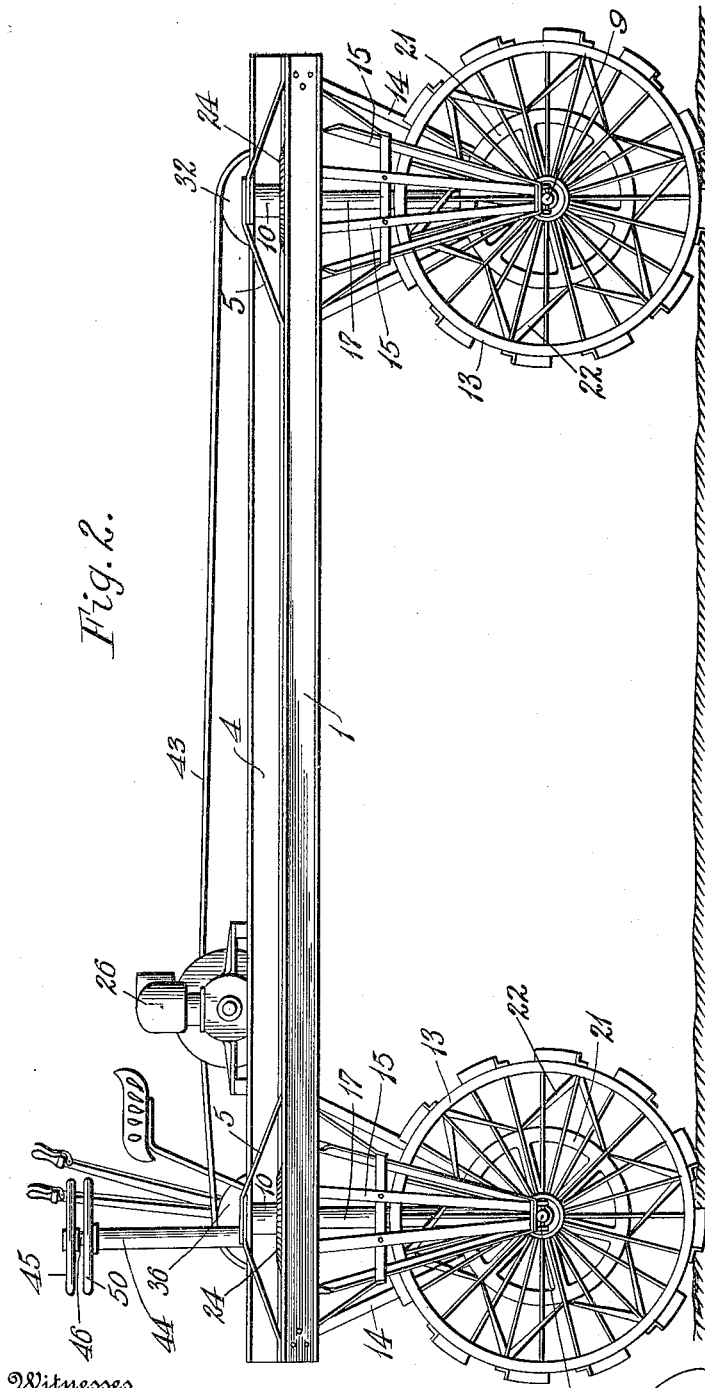

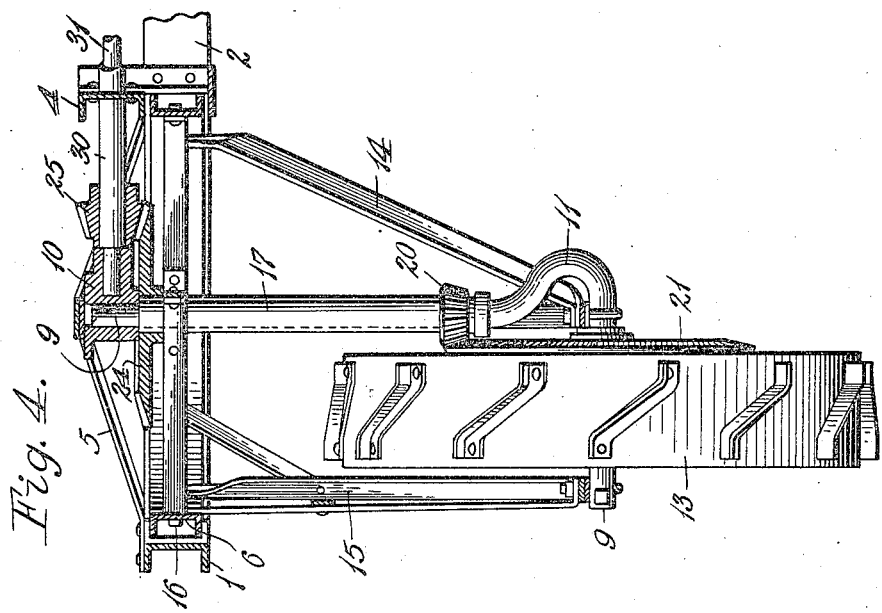
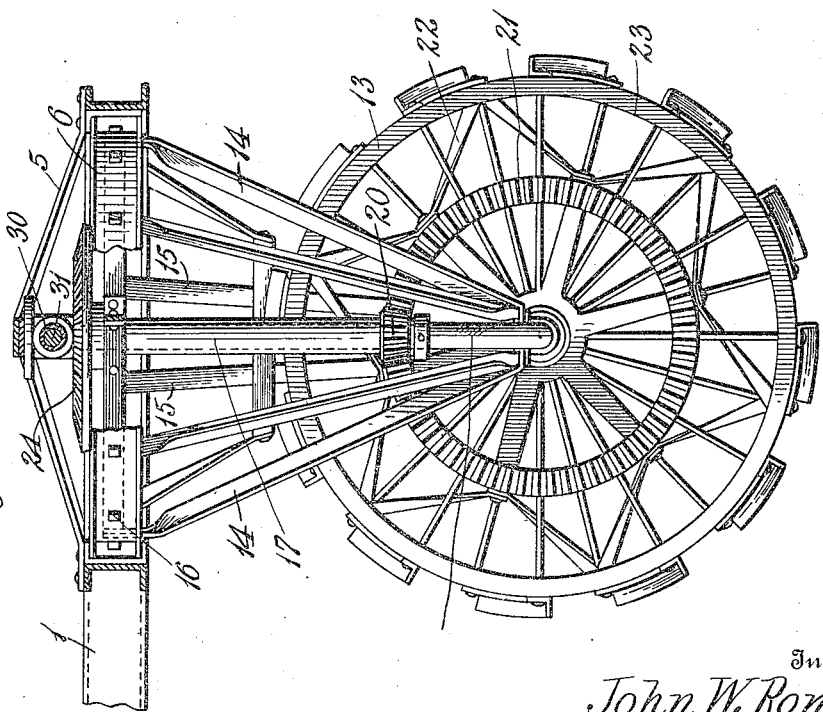

UNITED STATES PATENT OFFICE.

JOHN W. ROMINE, OF MONROE, MICHIGAN, ASSIGNOR OF ONE-HALF TO THE GREENING NURSERY COMPANY, OF MONROE, MICHIGAN, A CORPORATION.

TRACTOR.

1,064,774.  Specification of Letters Patent.  Patented June 17, 1913.

Application filed September 25, 1912. Serial No. 722,200.

*To all whom it may concern:*

Be it known that I, JOHN W. ROMINE, a citizen of the United States of America, residing at Monroe, in the county of Monroe and State of Michigan, have invented certain new and useful Improvements in Tractors, of which the following is a specification, reference being had therein to the accompanying drawings.

In the cultivation of trees, shrubs, plants or the like in the plots or fields in which they are commonly placed in nurseries, cultivation by field machines, and more particularly machines drawn or operated by a tractor, is difficult because of the height of the trees or plants and is impracticable on account of the space required at the ends and sides of the field or plot for turning the cultivating machine when the row or rows are finished.

This invention relates to a tractor adapted for use in cultivating the fields or plots of a nursery or shrubbery containing plants, shrubs or trees which may reach considerable heights and to an arrangement thereof whereby space for turning of the machine at the ends or sides of the field is conserved and whereby the tractor may be used even with plants of four or more feet in height.

The invention consists in the matters hereinafter set forth and pointed out in the appended claims.

In the drawings, Figure 1 is a plan view of a tractor, with parts omitted, that embodies features of the invention; Fig. 2 is a view in side elevation thereof; Fig. 3 is a view in side elevation and in detail of a traction bearing wheel and driving mechanism therefor; and Fig. 4 is a view of the wheel taken at right angles to the plane of view of Fig. 3, partially in section and partially in elevation.

As shown in preferred form a substantially rectangular frame is formed of side members 1 of channel iron or the like, united in spaced and parallel relation by end members 2 and a pair of transverse members 3 at an interval from the ends. Longitudinally disposed beams 4 connect the end and transverse members and form substantially rectangular bearing frames at the corners of the main frame where the whole structure is braced by suitably disposed diagonal braces 5. A circular plate 6 or circle bar is rotatably mounted at each corner of the frame to turn in the plane thereof, and is preferably secured between inwardly extending flange guides 7 on the transverse members 3, the sides 1 and end members 2. A pair of friction rollers 8 on each beam 4 coact with the flange guide 7 to hold the circular plate 6 in position and especially to resist lateral movement of the latter inwardly.

Upright shafts 9, each in axial alinement with a circular plate 6, are stepped at their upper ends in suitable bearings 10 which are secured to the members 5 or other convenient portions of the main frame. Each shaft 9 has a gooseneck 11 at its lower end with a horizontal extension that forms a journal for a traction bearing wheel 13. The journal is braced to the companion circle bar 6 as by properly disposed convergent struts 14 and 15, the upper end portions of the latter being secured in regular spaced relation to the circle bar. As a matter of convenience in construction square bolt or rivet heads 16 of the securing members project from the circle bar 6 as teeth for a sprocket chain.

A sleeve 17 is journaled on each shaft 9. A pinion 20 on the lower end thereof meshes with a beveled gear 21 that is suitably secured to the companion traction wheel 13. As a convenient method of holding this driving gear in position obliquely disposed brace rods 22 are bolted to the periphery of the gear with their end portions secured to the tread rim 23 of the bearing wheel. A beveled gear 24 is keyed or otherwise secured to the upper end of the sleeve 17 and is in mesh with a beveled pinion 25.

A motor, indicated at 26, of any preferred type, is mounted on the frame members 4 with the main drive shaft 27 thereof connected as by any preferred change speed reversing mechanism such as shown at 28 with a jack shaft 29. The pinions 25 are each secured to one of the members, (either the hollow journal 30 or inner shaft 31) of a transversely disposed two-part differential follower shaft, each pair of wheel drive shafts being thus coupled together. The sleeve 30 and member 31 on each differential shaft are connected by suitable differential gearing indicated at 32 to a sprocket wheel 33. Preferably the differential consists of beveled pinions 34 radially disposed on the sprocket wheel 33 and engaged with oppositely arranged beveled gears, one of which, 35, is keyed to the sleeve 30 while the other, 36, is made fast to the shaft 31. One of the sprockets 33 is in alinement with a sprocket wheel 37 rotatable on the jack shaft 29 while the other sprocket wheel 33 is in alinement with a sprocket wheel 38 likewise rotatable on the shaft 29. A spider 39 is keyed to the shaft 29 between the sprockets 37 and 38 and carries radially disposed beveled pinions 40 in mesh both with a beveled gear 41 secured to a sprocket 37 and a beveled gear 42 rigidly connected to the sprocket 38, thereby affording a differential driving mechanism for the shaft 29. Suitable sprocket chains 43 connect the sprockets 33 with this differential mechanism. A steering wheel post indicated at 44 near one end of the main frame affords support for a steering wheel 45 with shaft 46 and sprocket wheels 47 thereon. Suitably disposed chains 48 connect the steering wheel sprockets each with a circle bar 6 so that the latter respond to the turning of the hand wheel 45. A tubular shaft that is journaled on the steering wheel post 44 has a steering wheel 50 in close proximity to the steering wheel 45 so that an operator may grasp both wheels and manipulate them simultaneously. A sprocket wheel on the end of the tubular shaft operates a chain 52 passing over suitably disposed idlers 53 preferably on the frame members 4 and thereby turns a sprocket wheel 54 at the other end of the main frame. The latter has two steps, each connected by a suitably disposed chain 55 with the adjacent circle plates 6.

The usual and necessary braces, not shown herein, are employed to hold the frame in position and afford rigid support to the upright shafts which are of such height that the frame when mounted on the traction bearing wheels passes freely over shrubs four or five feet in height. Furthermore the necessary controlling means (not shown herein) for operating the change and reversing gearing and for regulating the engine speed are employed. While the form of differential driving mechanism herein shown is preferable, any suitable means may be used whereby the forward and back transverse shafts are differentially connected to the jack shaft turned by the motor, and similarly, the forward and back shafts may be of any preferred type of differential drive members adapted to impart the necessary motion to the upright shafts and therefore to the traction wheels.

The tractor in operation may be driven and controlled as readily as any self propelled vehicle while it may be made to move sidewise or to follow a return path as in cultivating, without being turned around. This makes it of a special advantage in cultivating trees, shrubs or the like, parked in the fields in the manner common in nurseries and shrubberies. The cultivator, plow or other instrument that is drawn by the tractor may be secured to the latter between the ends thereof, and the tractor may be made to follow longitudinal or transverse rows without turning it around so that there is no waste space necessary at the end or side of the fields.

Obviously, changes in the details of construction may be made without departing from the spirit of my invention and I do not care to limit myself to any particular form or arrangement of parts.

What I claim is:—

1. A tractor comprising a frame, a pair of bearing members rotatable in the plane of the frame at each end thereof, upright shafts each rotatable in and in axial alinement with a bearing member, a traction bearing wheel journaled on the horizontal extension of each shaft, mechanism for driving each wheel coupled to afford differential movement of the wheels of each pair, a motor on the frame for driving the mechanism, and means for turning the wheels of each pair in unison independently of the other pair.

2. A tractor comprising a frame, a pair of depending upright shafts journaled near each end of the frame and provided with lateral extensions near their lower ends, traction bearing wheels mounted each on a lateral extension, manually operable means for turning the shaft on each pair in unison independently of the other pair, differential mechanism coupling the traction bearing wheels on each pair and driving the latter when in any position, a motor, and mechanism operatively connecting the motor to the differential coupling means of each pair for driving said coupling means differentially.

3. A tractor comprising a main frame, a pair of upright shafts depending from each end portion thereof, and each having a lateral extension, a circle plate secured to each shaft and rotatably secured in the frame, a steering wheel for each pair of circle plates, means operatively connecting each steering wheel and the companion circle plates to turn the latter in unison, a motor, and differential and change speed transmission mechanism operatively connecting the motor to each traction wheel.

4. A tractor comprising a main frame, a pair of upright shafts depending from each end portion thereof, and each having a lateral extension, a circle plate secured to each shaft and rotatably secured in the frame, a steering wheel for each pair of circle plates, means operatively connecting each steering wheel and the companion circle plates to turn the latter in unison, a motor, and differential and change speed transmission mechanism operatively connecting the motor to each traction wheel, the steering wheels of the pairs being mounted for simultaneous manipulation by an operator.

5. A tractor comprising a main frame, a pair of circle plates rotatably secured near each end thereof, upright shafts secured to turn with the circle plates and provided with lateral extensions near the lower ends thereof, a traction bearing wheel on each extension, a beveled gear on each traction wheel, a sleeve journaled on each shaft, a beveled pinion on each sleeve meshing with the wheel gear, a two-part differential shaft for each pair of circle plates, a pinion secured on each part near the adjacent circle plate, a beveled gear on each sleeve in mesh with a differential shaft pinion, gearing differentially connecting the two parts of each shaft, a motor on the frame, and mechanism operatively connecting the motor to the shaft differential mechanisms for driving the latter differentially relative to each other.

6. A tractor comprising a main frame, a pair of circle plates rotatably secured near each end thereof, upright shafts secured to turn with the circle plates and provided with lateral extensions near the lower ends thereof, a traction bearing wheel on each extension, a beveled gear on each traction wheel, a sleeve journaled on each shaft, a beveled pinion on each sleeve meshing with the wheel gear, a two-part differential shaft for each pair of circle plates, a pinion secured on each part near the adjacent circle plate, a beveled gear on each sleeve in mesh with a differential shaft pinion, gearing differentially connecting the two parts of each shaft, a motor on the frame, mechanism operatively connecting the motor to the shaft differential mechanisms for driving the latter differentially relative to each other, a steering wheel rotatably mounted on the frame for each pair of circle bars, and means operatively connecting each steering wheel with the companion circle bars and turning the latter in unison.

7. A tractor comprising a main frame, a pair of circle plates journaled thereon near each end, an upright shaft depending from each circle plate, brace members connecting the circle plate with the lower end portion of each shaft, a lateral extension near the lower end of each shaft, a traction bearing wheel journaled on each extension, a pair of steering wheels mounted on the frame, and sprocket connections between each wheel and the steering shaft therefor.

8. A tractor comprising a substantially rectangular horizontally disposed main frame, a pair of circle plates journaled near each end thereof, a shaft depending from each circle plate and having a lateral extension near the lower end thereof, a traction bearing wheel journaled on each extension, a gear on each traction wheel, a sleeve journaled on each shaft, a pinion thereon in mesh with the wheel gear, a gear on the upper portion of each sleeve, a differential shaft for each pair of upright shafts, pinions each secured on a part of a differential shaft in mesh with the upper sleeve gear, a main differential mechanism adapted to drive the two differential shafts, a motor, change speed and reverse mechanism connecting the motor to the main differential mechanism, a steering wheel rotatively secured on the main frame and connected to a pair of circle bars to swing the latter in unison, and a steering wheel rotatively secured on the main frame adjacent the other steering wheel and operatively connected to the other pair of circle bars to swing the latter in unison.

In testimony whereof I affix my signature in presence of two witnesses.

JOHN W. ROMINE.

Witnesses:
 Roy T. Sperry,
 Ella Troll.

---

Copies of this patent may be obtained for five cents each, by addressing the "Commissioner of Patents, Washington, D. C."